United States Patent [19]

George, Sr.

[11] Patent Number: 5,042,260
[45] Date of Patent: Aug. 27, 1991

[54] LIVE LOBSTER SHIPPING METHOD

[76] Inventor: Charles J. George, Sr., Four Northway, Lynnfield, Mass. 01940

[21] Appl. No.: 456,733

[22] Filed: Dec. 26, 1989

[51] Int. Cl.⁵ .............................................. F25D 3/08
[52] U.S. Cl. ...................... 62/60; 62/457.5; 62/457.2; 229/120.36
[58] Field of Search ................ 62/457.2, 457.5, 457.7, 62/60; 229/120.36, 120.38

[56] References Cited

U.S. PATENT DOCUMENTS

| 2,844,299 | 7/1958 | Kessler et al. | 62/457.5 |
| 2,979,227 | 4/1961 | Norton et al. | 62/457.5 |
| 3,236,206 | 2/1966 | Willinger | 62/457.2 |
| 4,819,793 | 4/1989 | Willard et al. | 62/457.5 |

FOREIGN PATENT DOCUMENTS 0554275  3/1958  Canada ........................... 229/120.36

Primary Examiner—Henry A. Bennett
Assistant Examiner—John Sollecito
Attorney, Agent, or Firm—Samuels, Gauthier & Stevens

[57] ABSTRACT

A shipping container for live lobsters and the like has an interior subdivided by partition walls into discrete compartments, each being configured and dimensioned to receive an individual lobster. The thus received lobsters are confined and segregated one from the other, and are thus safeguarded from injury during shipment.

4 Claims, 2 Drawing Sheets

LIVE LOBSTER SHIPPING METHOD

BACKGROUND OF THE INVENTION

1. Field of the Invention

This invention relates generally to the container art, and is concerned in particular with an improvement in containers of the type employed to ship live lobsters.

2. Description of the Invention

Conventionally, live lobsters are shipped in lots of 25 to 50 or more in large cartons lined with insulation. The lobsters are loosely contained and are not segregated one from the other. Thus, as the cartons are subjected to the usual rough handling by truckers, airline baggage handlers, shipping clerks, etc., the lobsters tend to be thrown against one another as well as against the carton side walls. This causes injury to the lobsters, often resulting in their death during transit. Even when the cartons are carefully handled, normal body contact between the lobsters can produce injury and maiming. Such premature deaths, injury and maiming result in significant financial losses, and in some cases make long distance shipments impractical.

A general objective of the present invention is to provide an improved shipping container incorporating internal partitioning means for confining and safely segregating the lobsters one from the other.

A further objective of the present invention is the provision of means for stabilizing the environment in which the lobsters are shipped, thereby avoiding haphazard and injurious contact of the lobsters with each other and with the container walls.

SUMMARY OF THE INVENTION

Briefly stated, the shipping container of the present invention comprises a carton having an interior enclosed by bottom, side and top walls, the latter preferably being made up of multiple flaps which can be opened to gain access to the carton interior, and which thereafter may be closed and stapled, glued or taped shut. A series of intersecting internal partitions subdivides the carton interior into a plurality of compartments, each being configured and dimensioned to receive and confine an individual lobster in a vertical orientation, preferably tail first. The thus received lobsters are segregated one from the other by the internal partitions and are held in a stabilized environment which safeguards them against injury. Frozen gel packs or other like cooling means are enclosed in the carton along with the lobsters to maintain an appropriate life supporting environment. Preferably, the carton walls are lined with thermal insulation, typically in the form of expanded polystyrene panels.

Advantageously, a liquid impervious barrier in the form of a polyethylene bag-like liner is provided between the container walls and the thermal insulation. This insures that any liquid introduced into the container along with the lobsters will remain contained and will not seep through the container walls to disfigure the container and contaminate surrounding packaging within the shipping environment.

Preferably, the individual compartments extend vertically between the top and bottom container walls. The height of the internal partitions is less than the distance between the top and bottom walls, thereby providing an undivided space overlying the individual compartments. The frozen gel packs are safely contained within this undivided space.

These and other objects, features and advantages of the present invention will become more apparent in connection with a detailed description of a preferred embodiment of the invention to be provided hereinafter with reference to the accompanying drawings, wherein:

DETAILED DESCRIPTION OF PREFERRED EMBODIMENT

Figure 1:
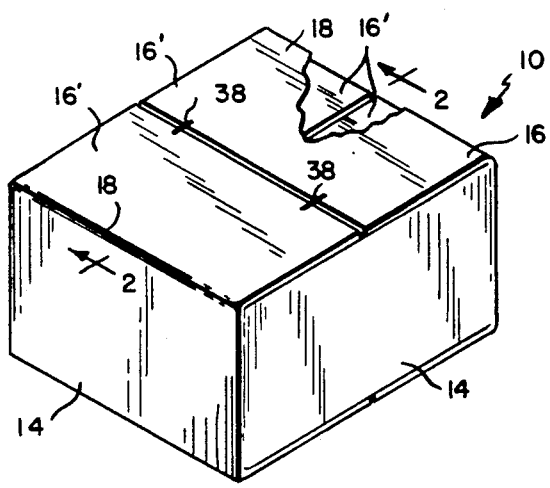
FIG. 1 is a perspective view of a shipping container in accordance with the present invention.

With reference to the drawings, a shipping container in accordance with the present invention is generally indicated at 10 in FIG. 1. The container includes a carton having an interior enclosed by a bottom wall 12, side walls 14, and a top wall 16 made up of flaps 16' which are integral with the side walls 14 and joined thereto along fold lines 18. The bottom wall 12 is also defined by flaps 12' integral with the side walls 14 and joined thereto by fold lines 20.

Figure 3:
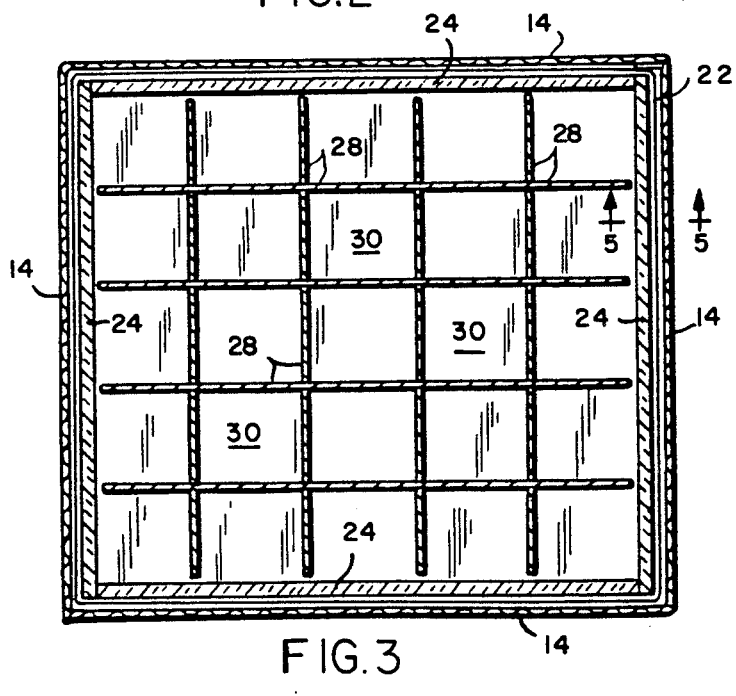
Figure 6:
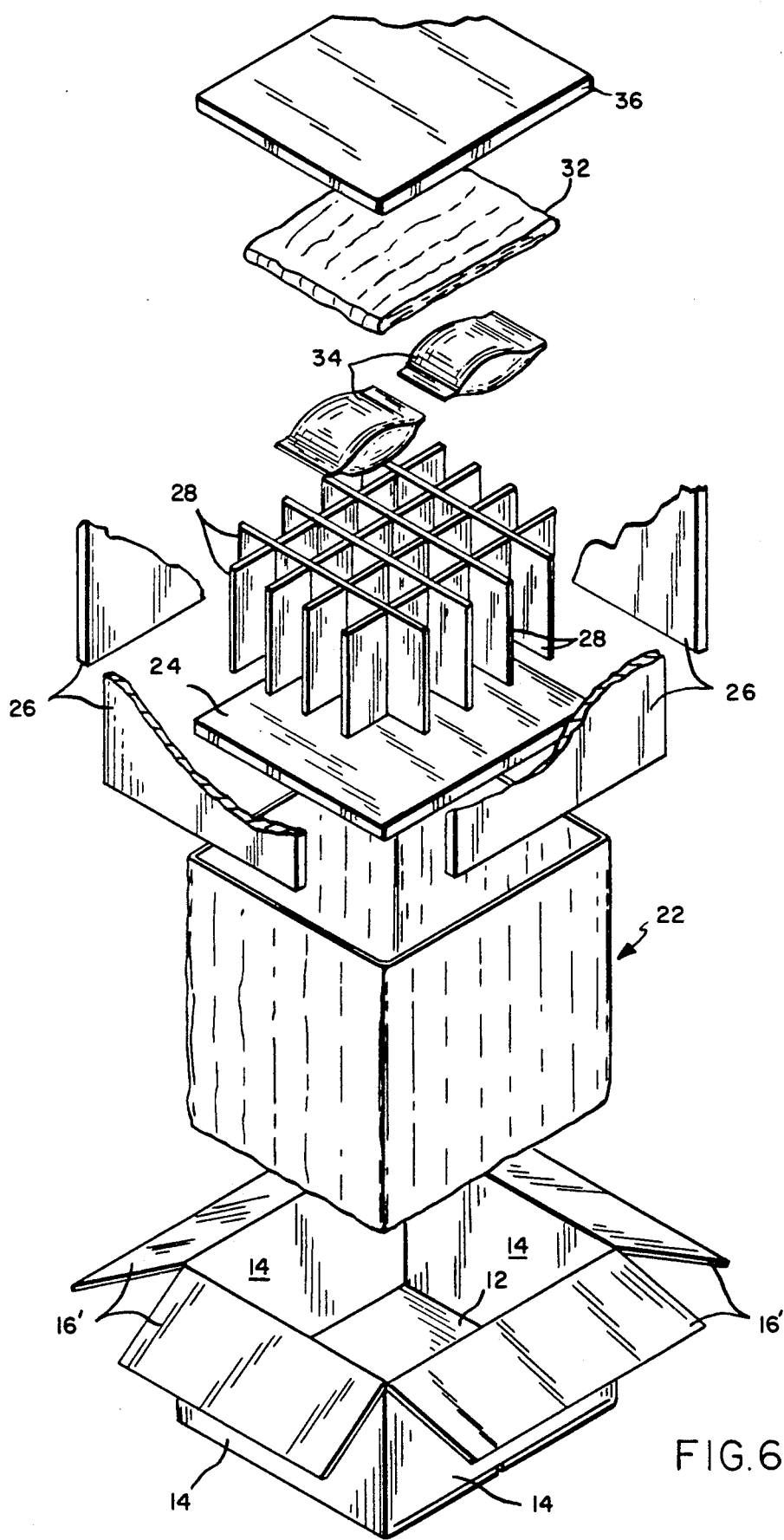

The carton may be "knocked down" to a flat condition (not shown) for storage. When erecting the carton, the side walls 14 are expanded to a rectangular configuration as shown in FIG. 3. The bottom flaps 12' are then folded in to define the bottom 12. The bottom flaps are securely interconnected, either by gluing, external taping or stapling. The top flaps 16' remain open to allow access to the interior of the carton for assembly of the remaining components to be hereinafter described. The open carton ready for receipt of such components is illustrated at the bottom of FIG. 6.

A liquid impervious liner, preferably in the form of a polyethylene bag 22 is then introduced into the carton. The bag lines the interior surfaces of the side and bottom walls 14,16, and has a height substantially greater than that of the side walls 14.

Thermal insulation means, typically although not necessarily in the form of expanded polystyrene panels 24,26 are then arranged to respectively line the bottom and side walls 12,14.

An intersecting array of partition walls indicated typically at 28 is then introduced into the container to subdivide its interior into a plurality of compartments 30. The partition walls 28 may also be folded flat to a "knocked down" condition (not shown) for storage.

Figure 2:
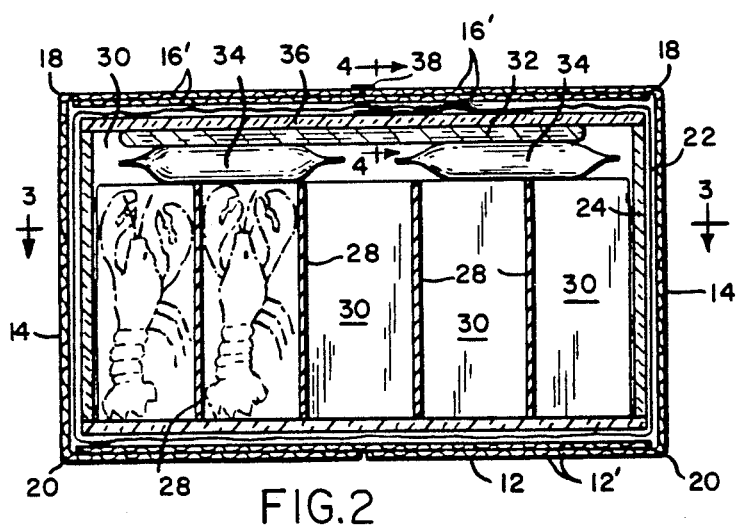
FIG. 2 is a sectional view on an enlarged scale taken along line 2—2 of FIG. 1.
Figure 4:
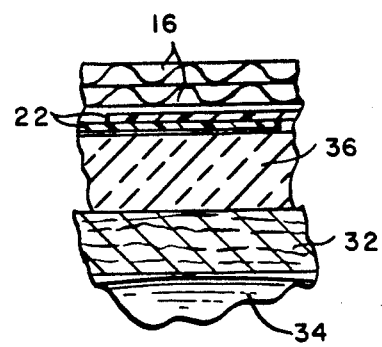
FIGS. 3 and 4 are sectional views taken respectively along lines 3—3 and 4—4 of FIG. 2, with FIG. 4—4 being on an enlarged scale.
Figure 5:
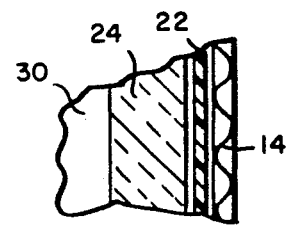
FIG. 5 is a sectional view, again on an enlarged scale, taken along lines 5—5 of FIG. 3; and, FIG. 6 is an exploded perspective view of the components making up the container.

Each compartment 30 extends vertically between the bottom and top container walls, and is configured and dimensioned to receive a single live lobster. Preferably, each lobster will be introduced into its respective compartment tail first, and will be retained safely and securely therein with its claws extending upwardly, as illustrated by the broken lines in FIG. 2.

In the container herein illustrated, twenty five compartments are provided. All may be filled with lobsters, or alternatively, some may be filled and others allowed to remain empty. Regardless of whether some or all of the compartments are filled, however, each lobster will remain securely held in its own compartment, and each will be safely segregated from the other.

The height of the partition walls 28 is less than the distance between the bottom and top container walls 12,16. Thus, there remains an undivided space 31 in the upper region of the container interior between the partition walls 28 and the top 16.

After the lobsters have been introduced into their respective compartments 30, cooling means, preferably in the form of one or more refrigerated gel packs 34, are then arranged on the top of the partition walls 28 within the space 30. The gel packs are then covered by sheets 32 of damp newspaper or the like. Another expanded polystyrene panel 36 is then introduced into the container. Panel 36 sits on the top edges of panels 24 and cooperates with panels 24 and bottom panel 26 to enclose the lobsters in a thermally insulated chamber, which together with the refrigerated gel packs 34 and damp newspaper sheets 32, maintains a life supporting environment for the lobsters.

The top of the polyethylene bag 22 is then folded over the top insulating panel 36, after which the top flaps 16' are folded into the closed position and held shut by any conventional means, such as for example the staples 38 shown in FIG. 1. Alternatively, the top of the polyethylene bag may be folded over the newspaper sheets 32 before applying the top insulating panel 36.

In light of the foregoing, it will now be appreciated by those skilled in the art that the present invention provides a novel and significantly improved shipping container for live lobsters. The advantageous features which coact one with the other to achieve this result include: segregating and securely retaining the lobsters in individual compartments, thereby eliminating death and injury that would otherwise result from the lobsters being thrown about and against each other during shipment; safely segregating the refrigerated gel packs from the lobsters in a separate area of the container interior; complete containment of the lobsters and the refrigerated gel packs within an insulated compartment defined by the polystyrene panels; and all liquids being safely retained within the container by the liquid impervious liner bag.

While the present invention has been described in connection with the packaging and shipment of live lobsters, other live crustaceans such as crabs can also benefit from being shipped in the same manner.

I claim:

1. A method of packaging live lobsters for shipment, said method comprising the steps of:

providing a carton large enough to accommodate a plurality of live lobsters, said carton having bottom, top and side walls, at least said top wall being comprised of flaps which may be opened to gain access to said interior;

introducing a protective means into said carton to safeguard lobsters contained therein from injury which might otherwise be occasioned by said lobsters being thrown about and against one another during shipment, said protective means defining a plurality of compartments within said carbon;

introducing lobsters into at least some of said compartments, the thus introduced lobsters being confined within said compartments and segregated one from the other;

arranging cooling means within said carton to lower the interior temperature thereof and thereby prolong the life of the lobsters confined within said compartments; and closing said flaps;

2. The method of claim 1 further comprising the step of lining the inside surfaces of said bottom, top and side walls with thermal insulation panels.

3. The method of claim 2 further comprising the step of interposing a liquid impervious barrier between said insulation panels and at least said bottom and side walls.

4. The method of claim 1 wherein the height of said protective means is less than the distance between said top and bottom walls, thereby providing an undivided space between the top of said partitioning means and said top wall, and wherein said cooling means is arranged in said undivided space.

* * * * *